Nov. 15, 1966  A. U. BRYANT  3,285,280
FLUID PRESSURE REGULATOR
Filed Dec. 18, 1964  2 Sheets-Sheet 1
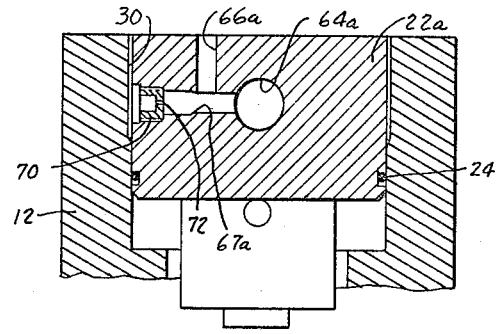
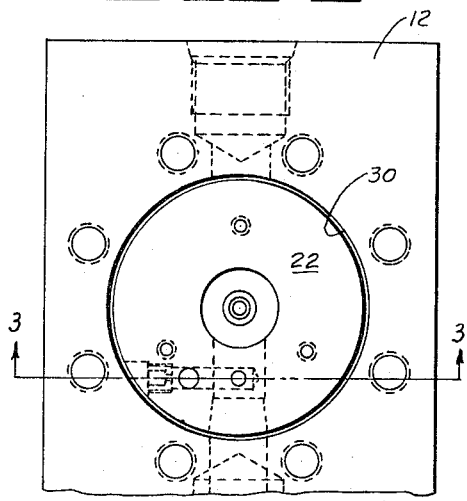
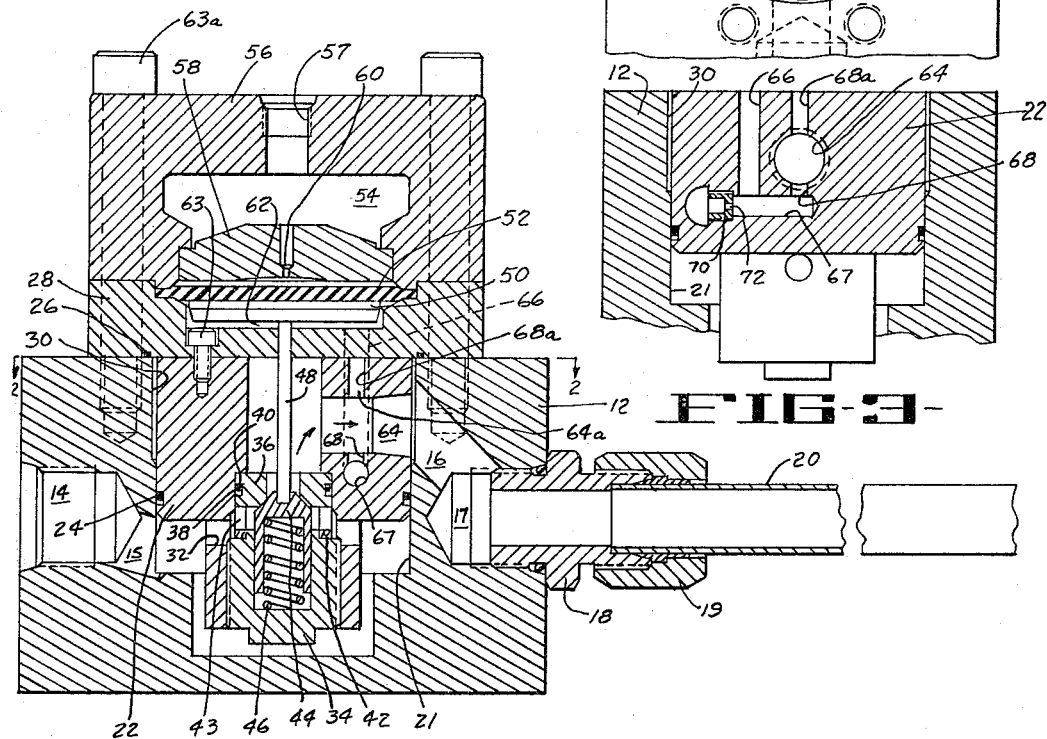
INVENTOR.
AUSTIN U. BRYANT
BY Gregg & Stidham
ATTORNEY

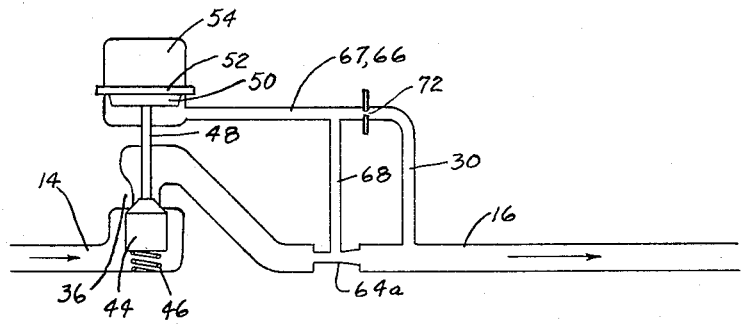
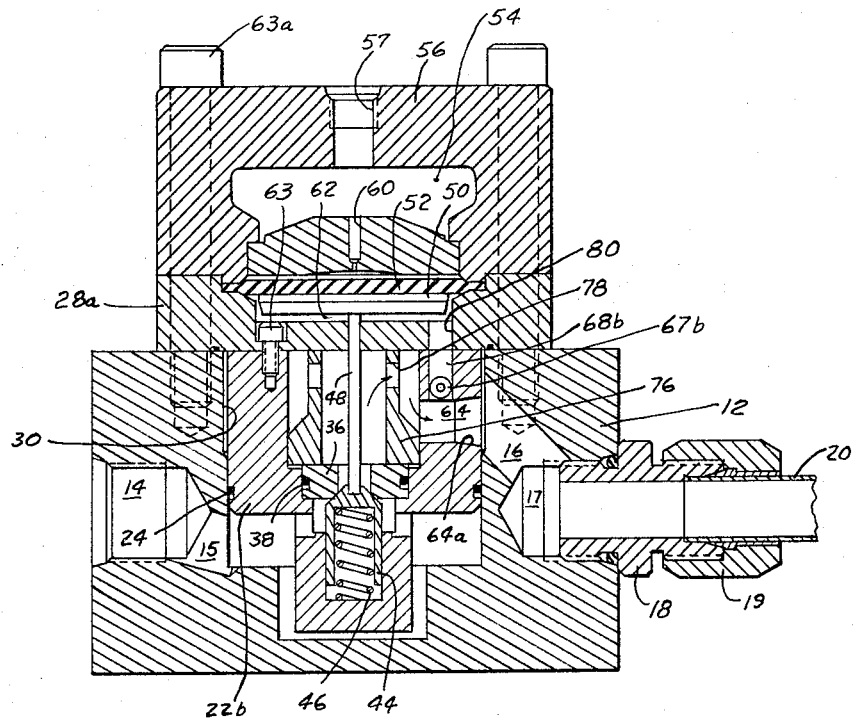

United States Patent Office 3,285,280
Patented Nov. 15, 1966

3,285,280
FLUID PRESSURE REGULATOR
Austin U. Bryant, Walnut Creek, Calif., assignor to Grove Valve and Regulator Company, Oakland, Calif., a corporation of California
Filed Dec. 18, 1964, Ser. No. 419,368
10 Claims. (Cl. 137—484.8)

This invention relates to a fluid pressure regulator and, more particularly, to a regulator which controls downstream pressure and which compensates for increasing pressure losses that characteristically result from an increase in rate of flow.

Regulators which are provided for the control of pressure in a fluid line commonly employ the use of a pressure-actuated device, such as a flexible diaphragm, to operate a valve in response to variations of the line pressure from a pre-set level. However, if the pressure is sensed immediately downstream of the controlling valve as is most convenient in a single regulator housing, no provision is made for downstream pressure losses occasioned by high rates of flow.

It is, therefore, an object of this invention to provide a regulator which compensates for the decrease in pressure downstream that characteristically accompanies an increase in rate of flow.

In carrying out this invention, I provide a venturi throat in the outlet passage just downstream of the control valve, and I provide a duct from the venturi throat to the diaphragm or other responsive member. Therefore, as the flow rate through the venturi throat increases, the sensing pressure acting against the diaphragm decreases proportionately. As a result, the actual downstream pressure, immediately beyond the venturi throat is greater than that actually being sensed by the diaphragm, by an amount that increases as flow increases, thus compensating in advance for the increase in pressure losses suffered downstream as a result of such flow increases.

While such a venturi will provide proportionate compensation, it is impossible to design a venturi that will provide the precise compensation required for every pneumatic or hydraulic system in which the regulator might be installed. As a result, the compensation in some systems may be either inadequate or excessive.

It is, therefore, a further object of this invention to provide a regulator including means for precise compensation for increases in downstream pressure losses resulting from increases in fluid flow.

In carrying out this invention, I form the venturi with characteristics which provide maximum compensation for downstream pressure losses in most, if not all, fluid flow systems in which installation of the regulator is contemplated. I then provide means for reducing the amount of pressure compensation to the precise level required. This is accomplished by providing a second connection from the pressure responsive diaphragm chamber to the downstream line beyond the venturi so that the pressure acting on the diaphragm is greater than the venturi throat pressure. Then, by providing an orifice of selected size in the second line, I can limit the ratio of downstream pressure fluid to throat pressure fluid acting against the diaphragm to the precise level required to provide accurate compensation for downstream pressure losses.

A further problem encountered in many regulators resides in the specific location in the downstream flow passage of the connection for the duct that brings the pressure responsive member in communication with the downstream flow passage. If such connection is directly in the path of fluid flow, the fluid pressure being detected may be distorted by the Pitot effect impinging through the port opening, particularly at low flow conditions when the valve is close to the seat creating a relatively high velocity jet through the narrow valve opening. Others have attempted to solve this problem by providing a Pitot tube with its opening directed downstream so that the pressure reading will be undistorted by the effects of velocity. However, such tubes are necessarily of small cross-section so as not to reduce excessively the flow capacity of the main conduit and they are, therefore, unable to withstand the high fluid pressures and vibrations to which they are subjected.

In solving this problem, I provide for flow from the control valve into the venturi throat at an angle to the axis of the venturi so that the initial high velocity jet impinges upon one side of the venturi wall leaving the other sides relatively free of impact. Then, the sensing duct to the pressure-responsive member opens into the venturi at a portion of the wall displaced from that against which the jet is directed, so that the detected pressure is not influenced by the effects of velocity.

Other objects of this invention will become apparent from the description following when read in conjunction with the accompanying drawings wherein:

FIG. 1 is a view in section of a pressure regulator embodying features of this invention;

FIG. 2 is a top view taken along line 2—2 of FIG. 1 and showing a sub-housing forming a part of this invention in place in the main valve body;

FIG. 3 is a section view taken along line 3—3 of FIG. 2;

FIG. 4 is another form of regulator embodying features of this invention;

FIG. 5 is still another form of regulator embodying features of this invention; and FIG. 6 is a schematic diagram illustrating the operation of the regulator of this invention.

Referring now more particularly to FIG. 1, the regulator 10 of this invention is mounted on a suitable body 12. Formed in the body 12 is inlet passageway 14, 15, connected to a source of fluid pressure (not shown) and an outlet passageway 16, 17, into which is connected a coupling element 18 for connection at 19 to a fluid conduit 20. The passageways 15 and 16 open into axially spaced portions of a central bore 21 that accommodates a cylindrical sub-housing 22 of the regulator 10. A suitable seal, such as O-ring 24 is disposed around the sub-housing 22 to prevent leakage between inlet and outlet passages 15 and 16. A second seal 26 is provided around the top of the sub-housing as, for example, in the mounting block 28, in order to prevent leakage from the outlet passage 16. The main accommodating recess 21 is enlarged at 30 at the level of, and in communication with, the outlet passage 16 for a purpose to be described hereinafter.

A series of inlet ports 32 are provided around the lower end of the sub-housing 22, and threadedly secured within the lower end of the sub-housing is a valve assembly 34. The valve assembly 34 includes a valve seat 36 of any suitable material, such as metal or plastic, preferably with a softer seal such as the O-ring 38 preventing leakage around it. The seat 36 is secured in place against a radial shoulder 40 by threading the valve assembly 44 against a port ring 42, having slots 43 aligned with the ports 32. The valve assembly 34 also includes a piston-like valve plug 44 that is urged against the seat 36 by means of a spring 46.

The valve 44 is operated and moved away from its seat by means of a push rod 48 that abuts against the bottom face of a plate 50 which is engaged by the underside of a flexible diaphragm 52. The diaphragm 52 is exposed to a pressure fluid supplied at a predetermined pressure to a chamber 54 formed within the block 56 from a suitable sources through a load line (not shown) connected at 57. Preferably, an orifice disc 58 with a restricted opening 60 is provided to limit flow in either direction between the chamber 54 and the diaphragm 52 and, hence, the dampen fluctuation of the diaphragm 52. A chamber 62 is formed below the diaphragm by a recess in the bottom, mounting block 28. The mounting block 28 is secured to the sub-housing by means of cap screws 63, and the whole assembly is secured to the main body 12 by cap screws 63a.

The lower diaphragm chamber 62 is exposed to pressure in the outlet port 64 by means of a three-directional sensing duct having sections 66, 67, and 68. As shown most clearly in FIGS. 2 and 3, the sensing duct is formed in part by downwardly extending bores 66 and 68 which are, respectively, displaced from and communicating with, the outlet port 64. In order to drill the passageway 68 opening into the downstream port 64, it is, of course necessary to drill from the top and thereby form a blind passageway 68a, which is blanked off by the diaphragm mounting block 28 and has no part in the operation of the valve. The vertical bores 66 and 68 intersect a horizontal bore 67, which is drilled from the side of the sub-housing 22 to form a continuous generally U-shaped sensing duct.

At this point it should be noted that the terms "horizontal" and "vertical" as used herein to describe the sections of the sensing duct are related solely to their relative positions in the drawings; and that their disposition would vary with the disposition of the regular itself.

It will be apparent that, since the pressure in the downstream port 64 is sensed at the bottom thereof, the pressure asserted against the diaphragm will be unaffected by the upwardly directed jet of fluid flowing in the directions of the arrows when the valve is first opened and before full flow is achieved. It will also be apparent that since the outlet port 64 forms a venturi throat 64a of restricted diameter before flaring out toward the downstream passage 16, the pressure in the port will be somewhat less than the pressure of fluid in the larger diameter outlet passage 16, 17 and immediately down the line 20. Pressure in a venturi throat it inversely proportional to the square of the flow rate and likewise pressure in a line also decreases by an amount proportional to the square of the flow rate in the same general relationship. Since the same sensing pressure is required to hold the valve 44 closed against the control pressure in chamber 54, and since the sensing presure is taken at the venturi throat, the actual downstream pressure is passage 16 beyond the throat 64 is greater than the sensing pressure by an amount that increases with an increase in flow rate. Therefore, the venturi 64 compensates for the customary decrease in downstream pressure that accompanies an increase in flow rate by delivering a pressure that exceeds the sensing pressure by an amount that increases with flow rate.

Inasmuch as the precise amount of compensation for pressure loss required is dependent upon the characteristics of the system in which it is employed, or even from section to section of a single system, the venturi cannot be designed for precise pressure regulation in all installations. Therefore, I have found it desirable to design the venturi 64a to over-compensate for pressure loss under all anticipated conditions and then provide an opposing modifying device which reduces the compensation to the precise level desired.

This feature is shown most clearly in FIGS. 2 and 3 wherein it will be noted that the horizontal portion 67 of the pressure sensing duct is closed by a plug 70 having a restricted orifice 72 of a selected size therethrough. The orifice opening 72 is at the level of the enlarged portion 30 of the main bore 20, which forms an annular passageway around the sub-housing to provide direct access from the orifice to the outlet passageway 16 at a point beyond the venturi 64a. Consequently, the fluid in the annular passageway 30 is at downstream pressure and, hence, is somewhat higher than that at the venturi throat by an amount that increases with flow through the valve. Therefore, the upwardly directed passageway 66 has flowing through it fluid at the depressed pressure of the venturi throat 64a, together with an amount of fluid at downstream pressure in proportions dictated by the size of the orifice 72.

As a result, the venturi 64a can be designed so that the pressure of fluid flowing through it decreases with increase in flow at a rate which will be excessive in any system in which it is contemplated that the regulator might be employed. Then the amount of correction is reduced to the precise level desired for a particular system by selection of an orifice plug 70, having an opening 72 of a size that will deliver the ratio of downstream fluid to venturi fluid necessary to reduce the rate of pressure reduction acting against the diaphragm 52 to the desired level.

The system of FIG. 1 is shown schematically in FIG. 6 wherein the valve plug 44 associated with the seat 36 is operated by the diaphragm 52 acting against the rod 48. Suppose fluid is delivered to the upstream flow passage 14 from a pump (not shown) at a pressure of about 6000 p.s.i., and it is desired to deliver a downstream pressure of 1000 p.s.i. In such case, the control fluid is introduced at a pressure level that will enable it to overcome the spring 46 plus 1000 p.s.i. pressure under diaphragm introduced from the downstream side of the valve 46; plus, in the valve shown, the force of the inlet pressure acting against the bottom of the valve plug 44. As shown, one relatively large capacity line 68 opens into the venturi 64a so that the pressure in line 68 is somewhat less than that in the downstream line 16 when the fluid is flowing. A second line 30 restricted by an orifice 72 communicates with the line 68 at line 66, 67 so that the pressure acting against the lower side of the diaphragm is less than the downstream pressure at 16, but higher than the reduced pressure at the throat of the orifice 64a. Thus the pressure acting against the bottom of the diaphragm may reach 1000 p.s.i. to enable the spring 46 and inlet pressure to close the valve plug 44. But the pressure in the venturi throat may be only 980 p.s.i. and the pressure downstream at 16 is 1050 p.s.i. to compensate for a calculated 50 p.s.i. pressure loss through fluid flow.

Again, the size of the orifice 72 is selected according to the particular characteristics of the fluid system so that the required ratio of high and low pressure fluid is directed against the diaphragm to provide precise control in the particular system. By proper selection of orifice plug 70, the regulator is conditioned for precise control in a wide range of applications.

Referring now to FIG. 4, I have shown a modified form of this invention wherein the lateral sensing duct 67a is drilled directly into the venturi throat 64a to open at one side thereof. As in the embodiment of FIGS. 1 to 3, a vertical duct 66a intersects the lateral duct 67a to introduce a proportionate amount of downstream pressure fluid through annular duct 30 and orifice 72.

Referring now to FIG. 5, I have illustrated still another embodiment of this invention, wherein a modified form of sub-housing 22b is provided. In this case, the spring 46 and valve plug 44 are inserted from the top and a flow reverser comprising a sleeve 76 having ports 78 in the upper portion thereof holds the valve seat 36 in position. With the flow reverser 76 in place, the fluid flows in the direction of the arrows from the valve seat 36 to the ports 78 which are above the outlet venturi port 64. Consequently, it must flow back and then in a downward direction toward the outlet port 64 so that a narrow stream, as when the valve 44 just opens, will impinge upon the bottom of the outlet duct 64. Thus the downward sensing duct 68b may be drilled just to the venturi 64 so that it opens into the top thereof. This duct 68b is brought into alignment with a bore 80 in the mounting block 28a so that the venturi pressure comunicates directly with the diaphragm chamber 62. In this case, a horizontal passage 67b may be drilled through the sub-housing 22b to bring the sensing passage 68b into communication with the annular passage formed by the enlarged bore 30. Thus the sensing passage may open into the venturi at any point around the surface thereof that is displaced from that point on the surface to which is directed a high velocity jet of fluid through the narrow opening when the valve is opened only slightly. This eliminates impact as a factor in the operation of the diaphragm 52.

While this invention has been described in connection with preferred embodiments thereof, it is apparent that other modifications and changes may be made within the spirit and scope of this invention as defined by the claims appended hereto.

Having described my invention, I claim:

1. A fluid pressure regulator comprising:
   a valve body,
   means forming axially spaced inlet and outlet flow passages in said body,
   means adapting said outlet flow passage for connection to a pipe line for fluid to be regulated,
   means forming a valve chamber in said body communicating transversely with said flow passages,
   a valve seat in said valve chamber in a plane intermediate said inlet and outlet flow passages,
   a valve member movable in said body into and out of engagement with said valve seat,
   a pressure-responsive member in said valve body,
   means driven by said pressure-responsive member when it is moved in one direction to move said valve member out of engagement with said valve seat,
   means applying a fixed force against one side of said pressure-responsive member to urge it in said one direction, and
   a sensing duct through said valve body opening into the wall of said outlet passage which is closest to said valve seat, plug means closing off said sensing duct at the surface of said valve body, and
   second duct means connected between said sensing duct and the other side of said pressure-responsive member.

2. A fluid pressure regulator comprising:
   a valve body,
   means forming axially spaced inlet and outlet flow passages in said body,
   means adapting said outlet flow passage for connection to a pipe line for fluid to be regulated,
   means forming a chamber in said body communicating transversely with said flow passages,
   a valve seat in said chamber intermediate said inlet and outlet flow passages,
   a valve member movable in said body into and out of engagement with said valve seat,
   a pressure-responsive member in said valve body,
   means driven by said pressure-responsive member when it is moved in one direction to move said valve member out of engagement with said valve seat,
   means applying a fixed force against one side of said pressure-responsive member to urge it in said one direction,
   a sensing duct through said valve body opening into a first wall portion of said outlet passage,
   plug means closing off said sensing duct at the surface of said valve body, and
   second duct means connected between said sensing duct and the other side of said pressure-responsive member, and
   means directing flow of fluid to said outlet passage in a direction so that initial flow impinges upon a second wall portion of said outlet passage displaced from said first wall portion.

3. The fluid pressure regulator defined by claim 2 wherein said last-named means comprises:
   a sleeve disposed in said chamber with one end thereof in alignment with said valve seat and at least one opening in the other end displaced from said outlet flow passage radially outward of said first wall portion.

4. The fluid pressure regulator defined by claim 2 wherein:
   said valve seat is disposed on one side of said outlet flow passage,
   said pressure responsive member is disposed on the opposite side of outlet flow passage, and
   said second duct extends from said pressure-responsive member through said body to a point therein displaced beyond said one side of the outlet flow passage, and said sensing duct extends along a generally L-shaped path to open into said outlet flow passage on said one side thereof.

5. The fluid pressure regulator defined by claim 2 wherein:
   said valve seat is disposed on one side of said outlet flow passage,
   said pressure-responsive member is disposed on the opposite side of said outlet flow passage,
   said second duct extends from said pressure-responsive member through said body to a point therein, and said sensing duct extends to open into said outlet flow passage at a point displaced from said opposite side thereof.

6. The fluid pressure regulator defined by claim 2 wherein:
   said valve seat is disposed on one side of said outlet flow passage, and
   said sensing duct opens into the other side of said outlet flow passage,
   and including:
   means forming a chamber communicating with said valve seat and said outlet passage, and
   an upright sleeve disposed in said chamber with one end thereof in alignment with said valve seat and at least one opening in the other end thereof beyond said other side of the outlet flow passage.

7. A fluid pressure regulator comprising:
   a valve body,
   means forming a receptacle in said valve body,
   means forming inlet and outlet flow passages in said valve body opening into said receptacle at axially spaced locations therein,
   means adapting said outlet flow passage for connection to a pipe line for fluid to be regulated,
   a regulator secured on said body with an extension thereof received in said receptacle,
   inlet and outlet ports in said regulator extension substantially at the level of said inlet and outlet flow passages, respectively,
   a valve seat in said regulator extension intermediate said inlet and outlet ports,
   a valve member movable in said regulator extension into and out of engagement with said valve seat,
   a pressure-responsive member in said regulator,
   means driven by said pressure-responsive member when it is moving in one direction to move said valve member out of engagement with said valve seat,
   means applying a fixed force against one side of said pressure-responsive member to urge it in said one direction,
   means forming a venturi throat in said outlet port,
   a first duct formed in said regulator extension to extend radially from said venturi throat,
   a second duct formed in said regulator extension to extend laterally from the outer surface thereof to said first duct,
   a plug in said second duct, and a third duct formed in said regulator to extend between said second duct, at a point intermediate said plug and said first duct, and the other side of said pressure-responsive member.

8. The fluid pressure regulator defined by claim 7 including:
means forming an orifice of predetermined size in said plug, and
means forming a fluid conduit communicating between said plug orifice and said outlet flow passage.

9. A fluid pressure regulator defined by claim 8 wherein:
said last-named fluid conduit comprises means forming a radial enlargement of said recess embracing said orifice plug and said outlet flow passage,
and including:
seal means between said regulator extension and the wall of said recess intermediate said inlet and outlet flow passages.

10. A fluid pressure regulator comprising:
a valve body,
means forming a receptacle in said valve body,
means forming inlet and outlet flow passages in said valve body opening into said receptacle at axially spaced locations therein,
means adapting said outlet flow passage for connection to a pipe line for fluid to be regulated,
a regulator secured on said body with an extension thereof received in said receptacle,
inlet and outlet ports in said regulator extension substantially at the level of said inlet and outlet flow passages, respectively,
a valve seat in said regulator extension intermediate said inlet and outlet ports,
a valve member movable in said regulator extension into and out of engagement with said valve seat,
a pressure-responsive member in said regulator,
means driven by said pressure-responsive member when it is moving into one direction to move said valve member out of engagement with said valve seat,
means applying a fixed force against one side of said pressure-responsive member to urge it in said one direction,
means forming a venturi throat in said outlet port,
means in said extension directing flow of fluid in a direction toward one side of said venturi throat,
duct means formed in said regulator extension to extend from said venturi throat, at a point displaced from said one side thereof, to the other side of said pressure-responsive member,
means forming a fluid conduit communicating between said duct means and said outlet flow passage, and
means forming an orifice in said fluid conduit.

References Cited by the Examiner

UNITED STATES PATENTS

| 2,173,416 | 9/1939 | Horstmann et al. | 137—484.8 |
|---|---|---|---|
| 2,599,577 | 6/1952 | Norgren | 137—484.8 |
| 3,013,432 | 12/1961 | O'Keeffe | 73—212 |
| 3,192,940 | 7/1965 | Wiersholm | 137—484.2 X |
| 3,204,657 | 9/1965 | Boyd | 137—484.8 |

M. CARY NELSON, *Primary Examiner.*

MARTIN P. SCHWADRON, *Examiner.*

R. J. MILLER, *Assistant Examiner.*